United States Patent [19]
Anderson et al.

[11] 3,762,116
[45] Oct. 2, 1973

[54] SPACE DIVIDER SYSTEM AND CONNECTOR ASSEMBLY THEREFOR

[75] Inventors: William C. Anderson; Raymond A. Bleeker, both of Grand Rapids, Mich.

[73] Assignee: Westinghouse Electric Corporation, Pittsburgh, Pa.

[22] Filed: July 2, 1971

[21] Appl. No.: 159,360

[52] U.S. Cl............... 52/239, 52/282, 52/495, 160/135, 160/351
[51] Int. Cl............................................ E04b 1/343
[58] Field of Search............... 248/125; 52/281, 52/495, 65, 238, 239, 309

[56] References Cited
UNITED STATES PATENTS

| | | | |
|---|---|---|---|
| 3,691,709 | 9/1972 | Ostborg | 52/239 |
| 3,517,467 | 6/1970 | Propst et al. | 52/36 |
| 3,631,640 | 1/1972 | Dunne | 52/238 |
| 3,677,322 | 7/1972 | Bronson et al. | 52/71 X |
| 3,690,365 | 9/1972 | Thompson | 160/351 X |
| 3,559,352 | 2/1971 | Magnuson | 52/36 |
| 3,513,606 | 5/1970 | Jones | 52/239 X |
| 3,605,851 | 9/1971 | Miles et al. | 52/495 X |
| 3,324,613 | 6/1967 | Duboff | 52/309 |

Primary Examiner—Frank L. Abbott
Assistant Examiner—Carl D. Friedman
Attorney—A. T. Stratton et al.

[57] ABSTRACT

A streamlined, modern, space dividing system for use in environmental office design applications and the like which includes one or more hollow tubular vertical posts having panel connector adaptors secured at each end forming extensions of uniform diameter with the post. Each panel connector adaptor includes a vertically oriented annular slot adapted to receive complementary hook connectors associated with the edges of one or more space dividing panels, thereby providing support for the panel in any angular orientation about the axis of the post.

9 Claims, 4 Drawing Figures

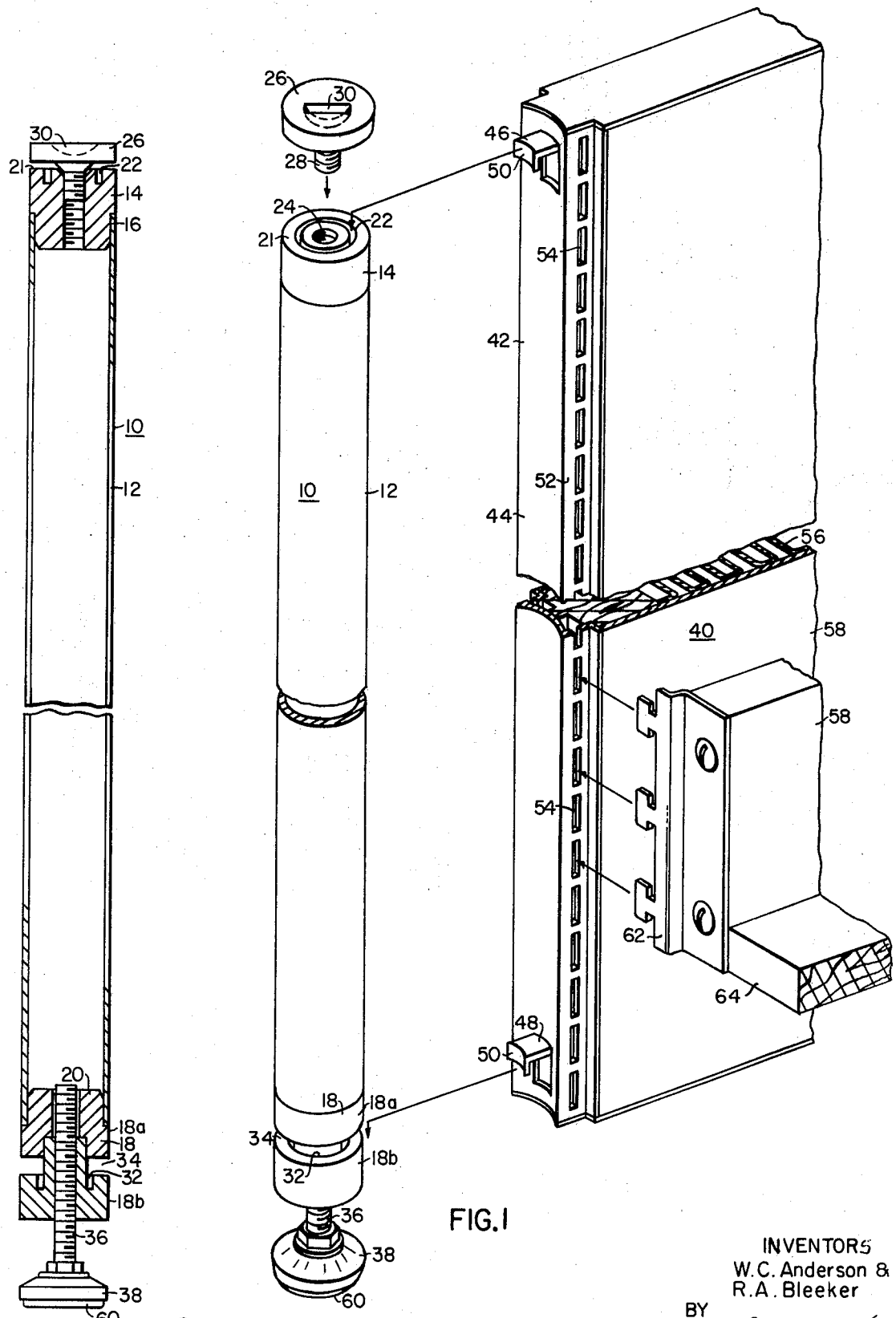

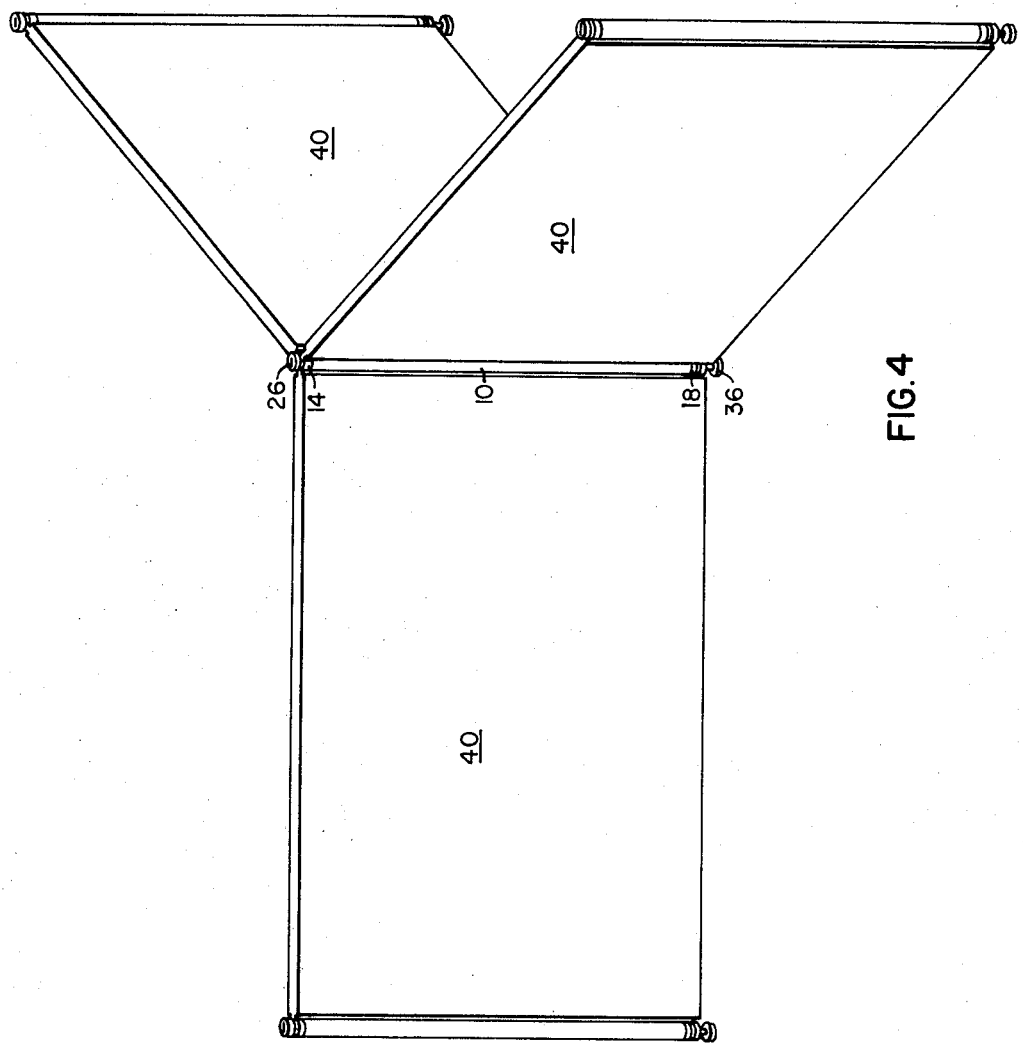

SPACE DIVIDER SYSTEM AND CONNECTOR ASSEMBLY THEREFOR

BACKGROUND OF THE INVENTION

This invention relates to space dividing systems and more particularly to a novel connector assembly and support post for connecting space dividing panels commonly employed in the modern planning of interior office spaces involving the so-called concept of "office landscaping".

Although the field of office landscaping is relatively new, there has been a high level of developmental activity over the recent past few years culminating in a multitude of varied connector assemblies and concepts. For the most part, these prior art systems have left something to be desired from an aesthetic standpoint in that much of the connecting hardware and devices necessary to the assembly of the space dividing system are completely visible thereby detracting from the unitary appearance of the space dividing structure. Furthermore, many of the prior art space dividing systems require numerous different kinds of hardware to assemble the various elements of the space dividing system.

An additional, and significant, factor in the design of interior space dividing systems is the relative ease of assembly, disassembly and mobility of the units. For example, many systems have adjustable connectors on the support posts as well as adjustable connectors on the panels and the relative adjustment of these various connectors require careful assembly to insure aesthetically complementary appearance from the standpoint of symmetry and alignment. The interior space divider arrangement disclosed in U.S. Pat. No. 3,559,352 to R. A. Magnuson is illustrative of an interior space dividing system which solves many of the problems of the prior art and represents a significant advance in terms of asethetics and ease of assembly. However, the connecting collars of the Magnuson system are quite visible and in assembling the space divider system of that patent the adjustable collar feature requires careful alignment to insure symmetrical and plumb relationships between the various panels.

SUMMARY OF THE INVENTION

The space dividing system of this invention is significantly superior to prior art developments in that all of the connecting hardware is substantially hidden from view with the universal connector assemblies on the support posts completely hidden within the silhouette of the support post while additionally providing fixed locations for the connectors facilitating quick and simple assembly of the space divider system.

The foregoing is provided in the space dividing system of this invention by including in combination at least one connector assembly and support post for supporting and connecting one or more space dividing panels, said connector assembly and support post comprising a vertically disposed tubular body member having panel connector means connected to each end of the tubular body member and forming extensions thereof which are of the same external diameter as the tubular body member and which include horizontally disposed axially aligned annular slots therein. Each of the one or more space dividing panel means include a vertically disposed planar panel which has an elongated exteriorly concave curved channel secured to its vertical edges and which has upper and lower connector hooks extending from the curved surface of the channel and constructed and arranged to be retained in the annular slots in the panel connector means to thereby support the space dividing panel means on the connector assembly and support post. The connector assembly and support post further includes a post leveler threadably received in the bottom of the support post and a post cap which is threadably received in the upper panel connector means to secure the upper connector hook into the upper annular slot.

BRIEF DESCRIPTION OF THE DRAWING

Many of the attendant advantages of the present invention will become more readily apparent and better understood as the following detailed description is considered in connection with the accompanying drawing, in which:

FIG. 1 is a perspective view illustrating the connector assembly and support post of this invention and the connecting edge of a space dividing panel;

FIG. 2 is a sectional view taken along the center line of the connector assembly and support post of FIG. 1;

FIG. 4 is a perspective view illustrating the connection of three space dividing panels to a connector assembly and support post.

DESCRIPTION OF THE PREFERRED EMBODIMENT

Figure 3:
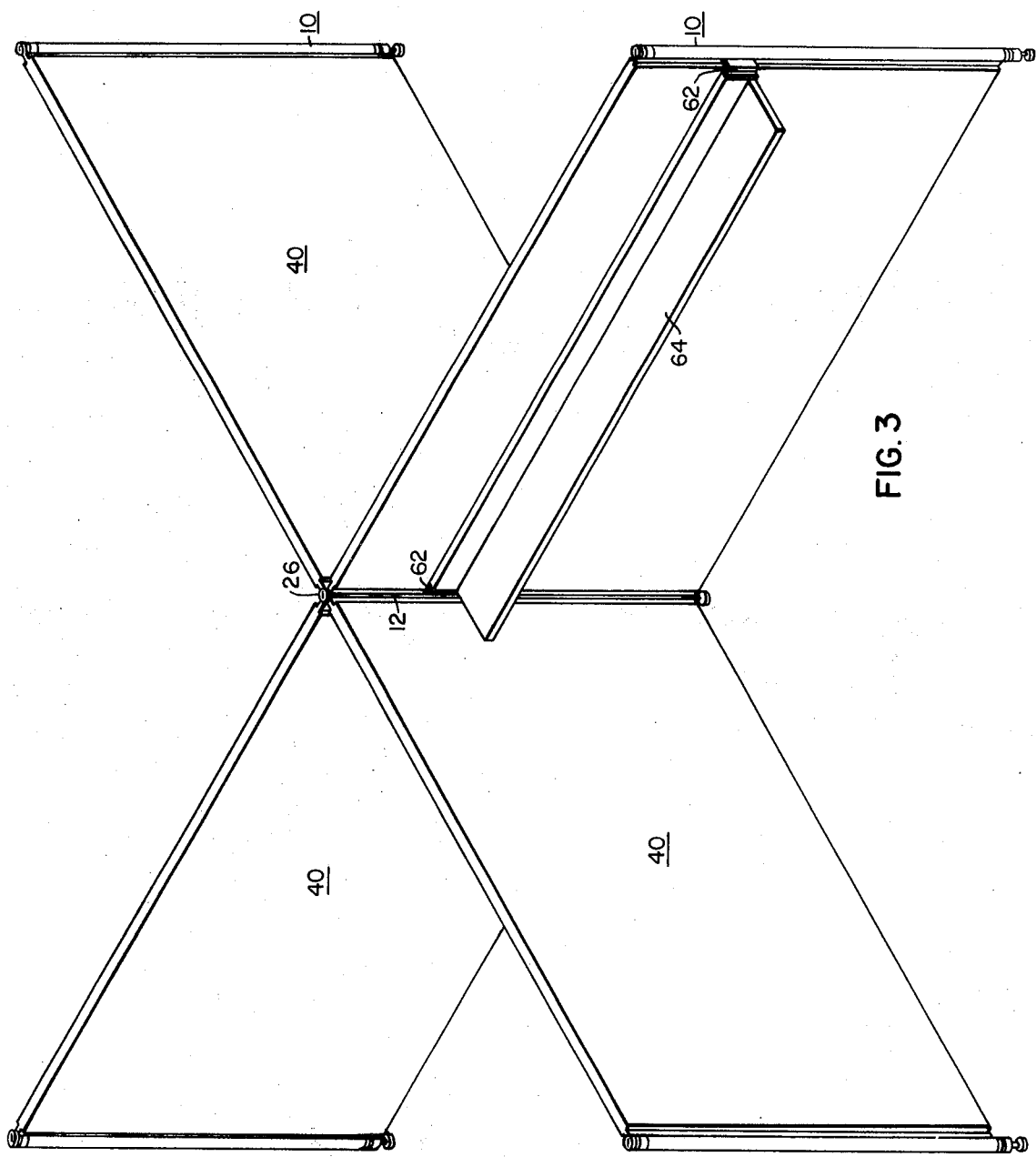
FIG. 3 is a perspective view illustrating the connection of four space dividing panels to a central connector assembly and support post.

Referring now in detail to the drawing wherein like reference characters represent like parts throughout the several views there is illustrated in FIGS. 1 and 2 the connector assembly and support post generally designated 10 for supporting and connecting one or more space dividing panels. The principal constituent of the connector assembly and support post is an elongated, open ended, hollow tubular body member 12 of predetermined length and predetermined external diameter adapted for vertical orientation. The tubular body member or central portion of the post 12 is closed off at the upper end by a plug-like panel connector element 14 which is of the same external diameter as the tubular body member at its maximum diameter and includes a tapered and shouldered lower portion illustrated at 16 which is force-fit into the upper end of the hollow tubular body member. At the bottom of the hollow tubular body member is a second plug-like panel connector element 18 which also includes a plug-like tapered and shouldered portion at 20 which closes off the open bottom by a force-fit into the bottom of the hollow tubular body member. The post top connector element 14 includes in its upper outer surface 21 an annular slot 22 which is adapted to receive a complementary hook connector from the panel in a manner later to be described. The post top connector element also includes a threaded, axially aligned, central bore 24 which is adapted to receive the post cap 26 which includes a threaded stud member 28 and a screwdriver key 30.

The post bottom connector element 18 as illustrated in FIG. 2 is shown in two parts, the plug portion 18a and a second cylindrical portion 18b which is force-fit into the part 18a and is of the same maximum external diameter as the portion 18a and the hollow tubular body member 12. Although illustrated in a two part construction the bottom connector element 18 may be a single element. The bottom connector element 18 includes an internally disposed, externally accessible, axially aligned, annular slot 32 therein which is accessible through the radially directed, annular, cut-out portion 34 situated between the portions 18a and 18b. The bottom panel connector element further includes an axially aligned threaded bore which is adapted to receive the threaded stud 36 of the leveler, foot support 38. Alternatively, among other possibilities, a caster may be substituted for the foot support to provide mobility to the system.

The space dividing panels, generally designated 40, include on at least one edge thereof, and preferably on the two side edges, an external mounting strip or edge bracket which is secured to the edges of the panel or board 40 by any one of several conventional means. The outer face 44 of the mounting strip or end bracket 42 is preferably somewhat concave as will be apparent from FIG. 1 with a radius of curvature substantially similar to the radius of curvature of the support post 10. Alternatively, any recess in the strip which provides a similar light seal between the post and the panel could accomplish the same result. Formed at the top and bottom of the end bracket are hook connector extensions 46 and 48 which are formed preferably integrally with and directly from the end bracket and terminate in hooked portions 50 which have substantially the same radius of curvature as the annular slots 22 and 32. The side walls 52 of the end brackets include a plurality of notches 54 which serve to mount shelves, desk tops and similar items as will later be described.

As will be apparent the connector assembly and support post receives in its annular slots 22 and 32 the hook extensions 46 and 48 and the space dividing panel can then be situated in any angular relationship with the post through the entire 360° and each connector assembly and support post can accommodate a plurality of such space dividing panels. When a space dividing panel, through hook connectors 46 and 48, is mounted on the connector assembly and support post it is retained in position by tightening the threaded post cap 26 down against the top of hook connector 46 to thereby grip the hook connector 46 between the underside of the post cap 26 and the upper surface 21 of the panel connector element 14. The entire space dividing system can then be leveled through the threadably adjustable leveling foot 38.

In accordance with the preferred embodiment the elongated hollow tubular body member 12 is manufactured from cold rolled steel with a vinyl coating and has an external diameter of about 1½ inches. The post top and post bottom panel connector elements 14 and 18 are preferably of rigid polyvinyl chloride as is the post cap 26. All of the post cap and top and bottom post panel connector members are also of approximately 1½ inches in diameter. The panels are preferably a standard framed honeycomb core 56 coated with a high pressure decorative laminate 58. The external mounting strip 42 is preferably cold rolled steel and the leveler foot 38 is also constructed of steel with a plastic bottom portion 60.

The series of notches 54 in the side walls 52 of the end brackets 42 are adapted to receive hooked brackets as illustrated at 62 which may in turn support book shelves, cabinets, desk tops or the like 64 in a manner which is well known in the art.

The concave curve portion 44 of the end bracket 42, when a panel is connected to the support post, serves to eliminate the ability to see between the panel and the post and hence facilitates privacy between adjacent spaces separated by the space dividing system.

FIGS. 3 and 4 illustrate space dividing systems utilizing connector assembly and support posts and space dividing panels in accordance with this invention. FIG. 3 illustrates the assembly of four space dividing panels 40 on a single central connector assembly and support post 10 while FIG. 4 illustrates the assembly of three spaced dividing panels 40 on a single connector assembly and support post 10.

What is claimed is:

1. A space dividing system including in combination, at least one connector assembly and support post for supporting and connecting one or more space dividing panels, said connector assembly and support post comprising:

a vertically disposed tubular body member, panel connector means having the same external diameter as said tubular body member connected to each end of said tubular body member and forming extensions thereof, each of said panel connector means including a horizontally disposed axially aligned annular slot therein, each of said one or more space dividing panels including a vertically disposed planar panel having an elongated, slightly concave channel secured to its vertical edges, each of said elongated slightly concave channels including upper and lower connector hooks, said upper and lower connector hooks being constructed and arranged to be retained in said annular slots in said panel connector means to thereby support said space dividing panels on said connector assembly and support post.

2. A space dividing system according to claim 1 wherein a post cap is threadably received in the top of said connector assembly and support post and coacts with the top surface of the upper connector hook to thereby secure said panel means in a stationary relationship with respect to said connector assembly and support post.

3. A space dividing system according to claim 1 wherein said panel connector means connected to each end of the tubular body member and forming extensions thereof are secured to said tubular body member through a plug-like extension which is force-fitted into the interior of said tubular body member.

4. A space dividing system according to claim 1 wherein said upper and lower connector hooks include an extended portion and a hook portion, said hook portion being slightly concavely curved and with said curve having substantially the same radius of curvature as the annular slot in each of said panel connector means.

5. A connector assembly and support post for connecting and supporting one or more panel dividers of a space divider system, said connector assembly and support post comprising:

a hollow tubular body member of predetermined length, a first plug-like connector member secured in and closing off the top end of said hollow tubular body member, said first plug-like connector member having an annular slot in its surface remote from said tubular body member and a threaded aperture therein centrally of said annular slot, a second plug-like connector member secured in and closing off the bottom end of said tubular body member, said second plug-like connector having a radially directed annular cut-out portion with an axially directed annular slot therein adjacent the base of said radially directed annular cut-out portion and a threaded aperture in the bottom side of said second plug-like connector, cap means threadably receivable in said threaded aperture in said first plug-like connector with a portion thereof adapted to overlie said annular slot in the upper surface of said first plug-like connector member; and adjustable post support and system leveler means threadably secured in said threaded aperture in the bottom of said second plug-like connector.

6. A connector assembly and support post according to claim 5 wherein said hollow tubular body member, said first plug-like connector member and said second plug-like connector member have a uniform maximum external diameter and give the appearance of a unitary member.

7. A connector assembly and support post according to claim 6 wherein said hollow tubular body member is constructed from cold rolled steel and has a vinyl coating thereon and said first plug-like connector member and said second plug-like connector member are constructed of rigid polyvinyl chloride.

8. A connector assembly and support post for connecting and supporting one or more panel dividers of a space divider system, said connector assembly and support post comprising;

an elongated hollow tubular body member of predetermined length and predetermined external diameter adapted for vertical orientation, a first connector element associated with and closing off the upper end of said tubular body member, said first connector element having an annular slot in the upper surface thereof, a second connector element associated with and closing off the bottom end of said tubular body member, said second connector element having an internally disposed externally accessible, axially aligned, annular slot therein;

cap means threadably associated with said first connector element and overlying said annular slot in the upper surface thereof, and connector assembly and support post leveling means threadably engaging said second connector element, each of said tubular body member, first and second connector elements, cap means and leveling means having substantially identical maximum external diameters.

9. A connector assembly and support post according to claim 8 wherein said first and second connector elements have a plug-like end portion which is receivable in force-fit relationship with said hollow tubular body member to thereby secure said first and second connector elements to said tubular body member.

* * * * *